Dec. 15, 1970  T. O. PAINE  3,546,917
ADMINISTRATOR OF THE NATIONAL AERONAUTICS
AND SPACE ADMINISTRATION
TECHNIQUE OF ELBOW BENDING SMALL JACKETED TRANSFER LINES
Filed Sept. 30, 1968

INVENTORS
JAMES N. GARDNER
THOMAS L. NIELSON
BY
ATTORNEYS

United States Patent Office 3,546,917
Patented Dec. 15, 1970

3,546,917
TECHNIQUE OF ELBOW BENDING SMALL JACKETED TRANSFER LINES
T. O. Paine, Deputy Administrator of the National Aeronautics and Space Administration, with respect to an invention of James N. Gardner and Thomas L. Nielson, Sparks, Nev.
Filed Sept. 30, 1968, Ser. No. 763,868
Int. Cl. B21d 9/00
U.S. Cl. 72—369                5 Claims

ABSTRACT OF THE DISCLOSURE

A method of forming elbows or bends in a length of jacketed pipe, such as a cryogenic transfer line is disclosed. Two lengths of tubing are coaxially assembled and the annular space between them is filled with a congealable liquid such as water. The water is frozen, preferably very quickly, by passing liquid nitrogen through the core of the inner tube. The assembly is then bent to the desired radius using conventional pipe bending techniques while maintaining the water frozen. Satisfactory spacing between the inner and outer tubing is maintained for bends up to about 90°. Elbows of pipe up to about 2½ inch in outside diameter can be fabricated on site with portable bending machines.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

This invention relates to the bending of assemblies of concentric tubing and more particularly to a method for forming elbows in jacketed pipes while maintaining the separation between and the shape of the core and jacket pipes.

Description of the prior art

An increasing number of applications such as construction of heat transfer or cryogenic facilities in the aerospace, ship building, chemical and food processing industries requires extensive use of jacketed piping. Often bent lengths of particular dimensions and radius are required. The fabrication of bent, jacketed pipe requires a different radius bend for the jacket and the core pipe and the on site fabrication of these bent lengths has been time consuming and expensive.

In one standard technique, the inner and outer tubes are separately bent to the required radius. The outer tube is then split longitudinally and the bent inner tube is placed inside the two halves of outer tube, and the seams are welded closed.

OBJECTS AND SUMMARY OF THE INVENTION

It is an object of this invention to provide a quick and inexpensive technique for bending concentric assemblies of tubing to a selected radius.

Yet another object of the invention is the provision of a technique which is capable of on site production of jacketed piping in a greatly reduced fabrication time and at a considerably reduced cost.

These and other objects and advantages of the invention will become readily appreciated as the description proceeds.

According to the invention, bent, concentric pipe assemblies are fabricated by forming a coaxially assembly of two pipes. The annulus between the pipes is plugged at one end and is filled with a congealable liquid. The liquid is congealed and the assembly bent to the desired radius while the liquid in the annulus is maintained in the congealed condition.

The invention will now become better understood by reference to the following detailed description when considered in conjunction with the accompanying drawings.

DESCRIPTION OF THE PREFERRED EMBODIMENTS

Figure 1:
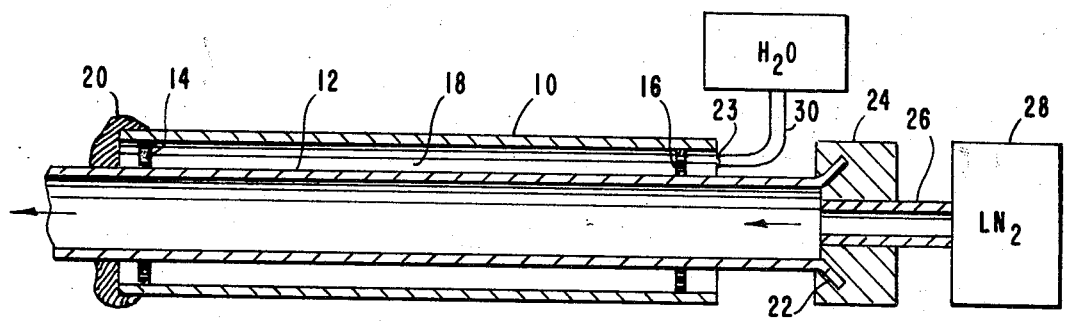
FIG. 1 is a schematic cross sectional view of a jacketed pipe illustrating the first part of the inventive method.

Referring now to FIG. 1, there is shown a length of jacket pipe 10 and a greater length of core pipe 12. The core pipe 12 is inserted into the jacket pipe 10 so that a short length extends from each end of the jacket pipe 10. These pipes are coaxially assembled and maintained in concentric separation by means of perforated end spacers 14 and 16.

A liquid tight seal 20 is formed at one end of the annulus 18 between the pipes by wrapping the core pipe 12 with adhesive cloth tape until the tape overlaps the jacket pipe 10. The nozzle end 23 of a water line 30 feeds into the open end of the annulus 18. One end of the core pipe is flared at 22 and receives a flared tube fitting 24. A liquid nitrogen line 26 is connected to the fitting 24 and the other end of the line 26 is connected to a source of liquid nitrogen at —320° F. housed in Dewar container 28.

In the fabrication of a jacketed pipe elbow according to the technique of the invention, a length of core tubing 12 and jacket tubing 10 are cut to the correct respective lengths. The core tubing 12 is flared at one end 23 to receive a flared tube fitting 24. The outer or jacket tubing 10 is slipped over the inner tubing, positioned so that the core tubing extends from each end of the jacket tubing and the assembly is coaxially aligned by inserting perforated spaces 14 and 16 at each end of the annulus 18. Cloth tape is wrapped from the inner to the outer tubing to provide a water tight seal 20.

The liquid nitrogen line 26 is connected to the fitting 24. The assembly of tubing is held in an inclined position and water is fed through the water nozzle 23 into the annulus 18. The liquid nitrogen is turned on and flows through the core tubing freezing the water. The assembly is then placed in a conventional pipe bender and longitudinally bent to the desired radius.

Figure 2:
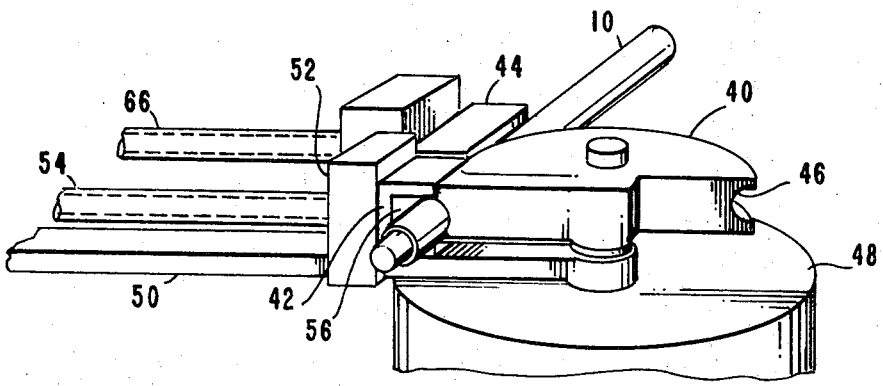
FIG. 2 is a perspective view of a straight length of jacketed pipe in a bending apparatus.
Figure 3:
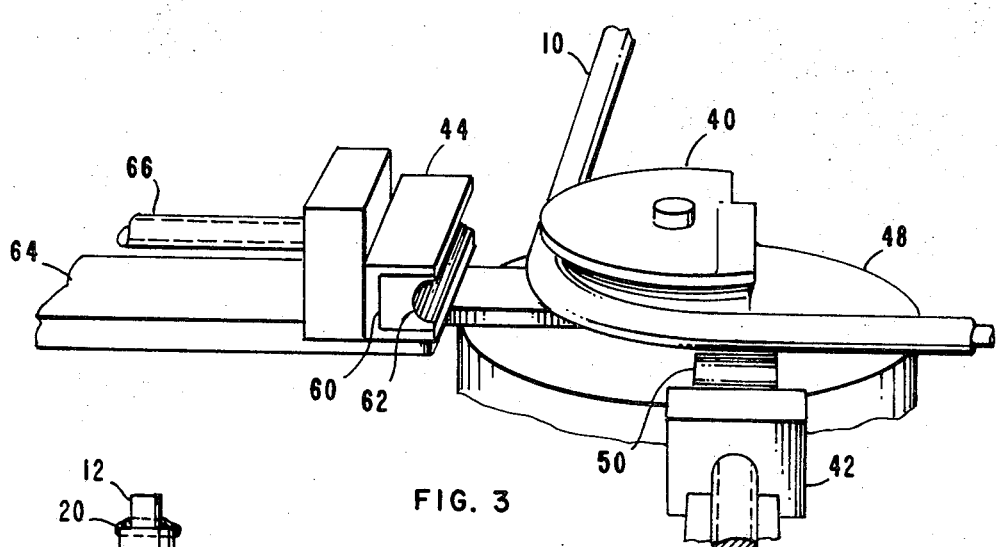
FIG. 3 is a further perspective view of the apparatus of FIG. 2 showing the pipe in position after formation of a 90° elbow.
Figure 4:
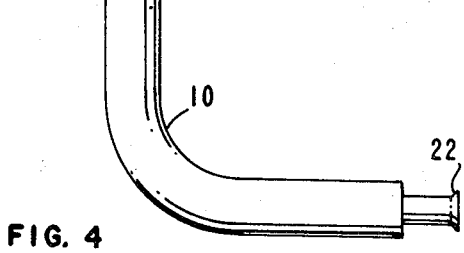
FIG. 4 is a side view of a finished bent-jacketed pipe according to the invention.

Referring now to FIGS. 2 to 4 the concentric assembly of pipes containing a frozen ice annulus is placed in a conventional radial pipe bending machine. The principal operating elements of the machine include a longitudinally curved die 40, a holding shoe 42 and a stiff back member 44.

The curved die 40 as shown has a hemispherical-shaped recess 46 along its outer length adapted to engage the outside surface of the outer pipe 10. The curved die 40 is mounted for rotation on a turntable 48. A rotation arm 50 is attached to the die 40 and to the turntable 48. The holding shoe 42 is mounted on this arm and includes a jaw 52 having grooved edges for slidingly gripping the arm 50 and a screw member 54 for moving the jaw toward the curved die 40. The jaw 52 receives a holding shoe die 56 having an outer hemispherical recess to grip the face of the outer pipe 10 opposite the curved die 40.

The stiff back member 44 comprises a straight die 60 having a hemispherical pipe engaging recess 62. The stiff back is mounted on a track 64 and is adapted on turning of screw member 66 to engage a section of the pipe 10 adjacent the holding shoe die 56.

To complete the bending operation the pipe 10 is placed in the recess 46 of the curved die 40 and the holding shoe die 56 is moved inwardly to engage the pipe at a joint corresponding to the initial curvature of the desired bend. The stiff back die 60 is also moved into engagement with the pipe 10.

A horizontal force is applied to the arm 50 and the curved die 40 and holding shoe 42 rotate laterally and move the pipe past the stationary stiff back member 44 which bends the pipe 10 to conform the curved die 40. As shown in FIG. 3 the curved die 40 and holding shoe 42 have been rotated 90° and a 90° bend has been formed in the pipe. Many suitable radial bending machines are available on the market such as the Parker Tube Bender. With smaller diameter piping the assembly can be bent by manual activation of the arm 50. With larger diameter tubing, pneumatic or mechanical actuation of the arm is required.

To complete the fabrication of the elbow, the temporary spacers 14 and 16 are removed and end place washers are welded to both the inner and outer tubing. Vacuum bosses are then welded on each end of the outer jacket. A hole is then drilled through the vacuum bosses and the outer jacket to complete fabrication of a cryogenic transfer line elbow.

As a result of forming a bend in a jacketed pipe, it is apparent that the outside pipe will contribute a larger portion of its length to the elbow than in the smaller radius of curvature suffered by the core pipe. Therefore, during the bending operation there will be relative movement between the pipe walls of the core pipe and the jacket pipe. It has been found that the annulus of ice does not form a high friction bond with the walls. The ice readily separates from the walls of the pipes and allows them to slide past the ice as the pipes are progressively bent in the bending machine. Another inherent result of bending a cylindrical pipe is to bend the inside radius less than the outside radius and to crowd the inner bend with excess material which can result in material upset and the formation of wrinkles on the inner or outer walls. However, with the assembly of the invention which contains a rigid and incompressible annulus of ice as the tubes slide past this rigid body of ice the wall surfaces are smoothed and stretched to prevent the formation of wrinkles. Furthermore, the annulus of ice acts as a die with respect to the core pipe and prevents any portion of it from going out of round during the bending operation.

The following example is offered by way of illustration and is not intended to in any way limit the invention.

EXAMPLE

A three and one-half foot length of 1½ OD steel tubing and a four foot length of 1 inch OD steel tubing were cut from tubing stock having a wall thickness of 0.065 inch. The inner tubing was flared at one end and the outer tubing was slipped over the inner tubing so as to be positioned about 6 inches from each end of the inner tubing. The tubes were concentrically located by inserting perforated spacers at each end of the annulus. Cloth tape was wrapped from the inner tubing to the outer tubing to provide a water seal.

A liquid nitrogen line was connected to the flared end of the inner tubing through a flared end fitting. The assembly of tubing was inserted into a vise in an inclined position, taped end down. Water was poured into the annulus until it was filled. Liquid nitrogen at —320° F. was flowed through the core quickly freezing the water into ice, which expanded and projected a slight amount from each end of the annulus.

The assembly was quickly placed in a conventional pipe bender and with the use of a semicircular die was bent to an angle of 90°. A midpoint of the bend was sectioned and examined, and satisfactory spacing was evidenced. All wall surfaces were smooth with no evidence of wrinkling or material upset.

Many fluids may be utilized as the congealable liquid to be filled into the annulus. For example, saline solutions or organic hydrocarbon or silicone liquids may be used and if desired these liquids may be recovered and reused. The liquid seal for the annulus may be provided by soft deformable materials, such as hydrocarbon waxes or putty like materials. The seal may be inserted into both ends of the annulus and the liquid added through a port drilled in the outer tubing.

High pressure sealing arrangements may also be utilized. As the liquid freezes and expands, this will place the pipe walls in tension which can further alleviate material upset and wrinkling of the inner bend. However, it is possible in some cases that the excess pressure from the transverse expansion of the liquid will be transferred to the pipe walls and could cause collapse of the inner tubing or rupture of the outer tubing. Therefore, it is preferred to allow all expansion to proceed laterally and allow the frozen liquid to push out at least one end of the annulus.

Congealing the liquid in the annulus may be accomplished by any suitable refrigeration means, for example, placing the assembly in a refrigerator cabinet or by flowing a heat exchange liquid in direct or indirect heat exchange relationship with the inner wall of the core or the outer wall of the jacket tubing. It is preferred to quickly effect the freezing of the liquid annulus by flowing a compressed, liquified gas through the core. This is a very convenient and simple technique and it results in a quick freezing of the liquid. The compressed gas vaporizes with a large absorption of heat from the surroundings with quick and even freezing of the liquid. With slow cooling, crystal formation and freezing may proceed first at the ends and block off the expansion of remaining liquid as it freezes with again a possibility of transferring excessive or uneven forces laterally to the walls of the tubing. Suitable cryogenic liquids are compressed and liquified nitrogen, helium, hydrogen, and the like. Nitrogen is preferred since it is a readily available cryogenic liquid and is nontoxic and can therefore be vented to the atmosphere without hazard to personnel.

The elbow bending method of the invention has been successfully utilized for on site fabrication of jacketed piping. Longitudinal bends of over 90° should preferably be avoided, due to the danger of exceeding the elastic limit of the outer bend and causing excess crowding of material at the inner bend. Portable bending machinery for on site utilization of the method is usually only effective to bend pipes having an OD of no more than about 3 inches and wall thicknesses of less than about 0.125 inch.

It is to be understood that only preferred embodiments of the invention have been disclosed and that numerous alterations and modifications and substitutions are permissible without departing from the scope of the invention as defined in the following claims.

What we claim is:

1. A method of forming a bend in a concentric assembly of pipes comprising the steps of:

inserting a longer core pipe into a length of jacket pipe to form an annulus therebetween such that a portion of the core pipe extends from each end of the jacket pipe;

concentrically spacing said pipes by inserting a perforated; temporary toroidal end spacer near each open end of the annulus between said pipes;

forming a low pressure water seal at one end of said annulus;

filling the annulus between the pipes with water through the open end of said annulus;

quickly congealing the water to form a rigid, continuous body of ice in said annulus by flowing liquid nitrogen through said core pipe; and simultaneously bending the pipes at a locatiton between said ends while maintaining the ice in the annulus in a congealed and rigid condition.

2. A method according to claim 1 in which the tubing has an outside diameter of no more than about 3 inches.

3. An assembly for forming a jacketed pipe elbow comprising:

a first length of cylindrical core pipe having a flared end;

a flared end fitting secured to said end;

a shorter length of a larger diameter cylindrical jacket pipe surrounding said core pipe forming an annulus and spaced such that each end of said core pipe extends therefrom;

temporary, toroidal perforated end spacer means inserted into said annulus near the ends thereof for coaxially spacing said core and jacket pipes;

means for forming a temporary water tight seal at the end of the annulus opposite said flared end;

a static body of water filled into the annulus through the open end thereof;

refrigerating means comprising a source of liquid nitrogen communicating with the core pipe through said fitting for congealing said water to form a solid, rigid, slidable body of ice in said annulus for forming concentric radii on bending said pipes.

4. A method according to claim 1 wherein said low pressure water seal is formed by closing the end of the annulus between said pipes with adhesive tape.

5. An assembly according to claim 3 in which said means for forming a temporary water-tight seal comprises a body of adhesive tape disposed over the open end of the annulus between said pipes.

References Cited

UNITED STATES PATENTS 3,343,250  9/1967  Berto et al. _____ 72—369

LOWELL A. LARSON, Primary Examiner

U.S. Cl. XR.

29—423